United States Patent
Sartorius et al.

(10) Patent No.: US 11,126,437 B2
(45) Date of Patent: Sep. 21, 2021

(54) LOAD INSTRUCTION WITH FINAL READ INDICATOR FIELD TO INVALIDATE A BUFFER OR CACHE ENTRY STORING THE MEMORY ADDRESS HOLDING LOAD DATA

(71) Applicant: Microsoft Technology Licensing, LLC, Redmond, WA (US)

(72) Inventors: Thomas Andrew Sartorius, Raleigh, NC (US); Thomas Philip Speier, Wake Forest, NC (US); Michael Scott McIlvaine, Raleigh, NC (US); James Norris Dieffenderfer, Apex, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/705,835

(22) Filed: Dec. 6, 2019

(65) Prior Publication Data
US 2021/0173655 A1 Jun. 10, 2021

(51) Int. Cl.
*G06F 9/30* (2018.01)
*G06F 9/38* (2018.01)

(52) U.S. Cl.
CPC ........ *G06F 9/3826* (2013.01); *G06F 9/30043* (2013.01); *G06F 9/3834* (2013.01); *G06F 9/3857* (2013.01)

(58) Field of Classification Search
CPC ... G06F 9/30043; G06F 9/3834; G06F 9/3857
See application file for complete search history.

(56) References Cited

U.S. PATENT DOCUMENTS

| 6,766,419 | B1 | 7/2004 | Zahir et al. |
| 9,600,288 | B1 | 3/2017 | Potter et al. |
| 2004/0078790 | A1 * | 4/2004 | Wu ........................ G06F 8/4442 717/154 |
| 2015/0058571 | A1 | 2/2015 | Potter et al. |
| 2017/0075810 | A1 | 3/2017 | Havlir et al. |

FOREIGN PATENT DOCUMENTS

GB 2270781 A 3/1994

OTHER PUBLICATIONS

"International Search Report and Written Opinion Issued in PCT Application No. PCT/US20/058990", dated Feb. 16, 2021, 12 Pages.

* cited by examiner

*Primary Examiner* — Jacob Petranek
(74) *Attorney, Agent, or Firm* — Withrow & Terranova, PLLC

(57) ABSTRACT

Providing express memory obsolescence in processor-based devices is disclosed. In this regard, an instruction set architecture (ISA) of a processor-based device provides a memory load instruction indicating a final memory load operation from a memory address (i.e., after the memory load operation represented by the memory load instruction is performed, the value at the memory address need not be maintained). Upon receiving the memory load instruction by an execution pipeline of the processor-based device, an entry corresponding to the memory address of the memory load instruction is located in an intermediate memory external to the system memory of the processor-based device, and used to perform the final memory load operation. After the final memory load operation is performed using the entry, a value of an obsolete indicator for the entry is set to indicate that the entry can be reused prior to its contents being written to the system memory.

18 Claims, 6 Drawing Sheets

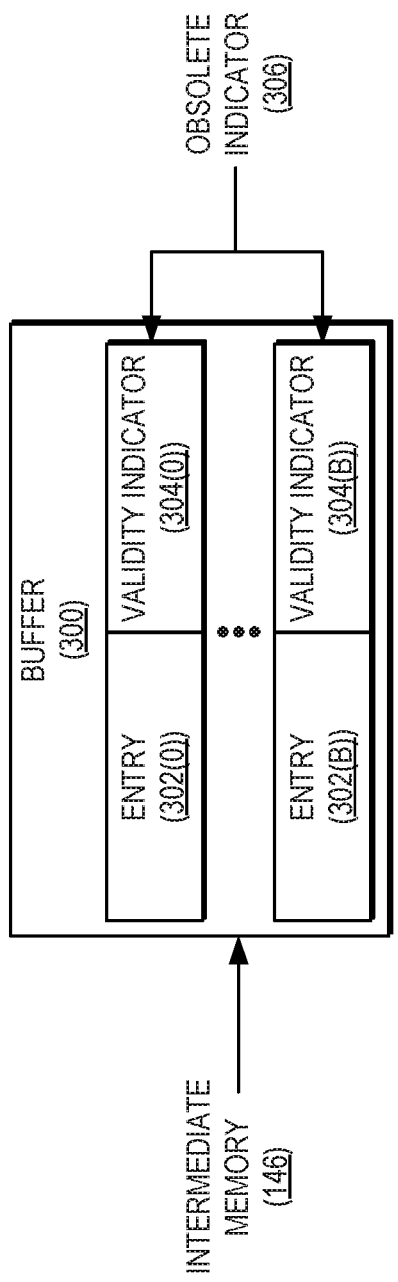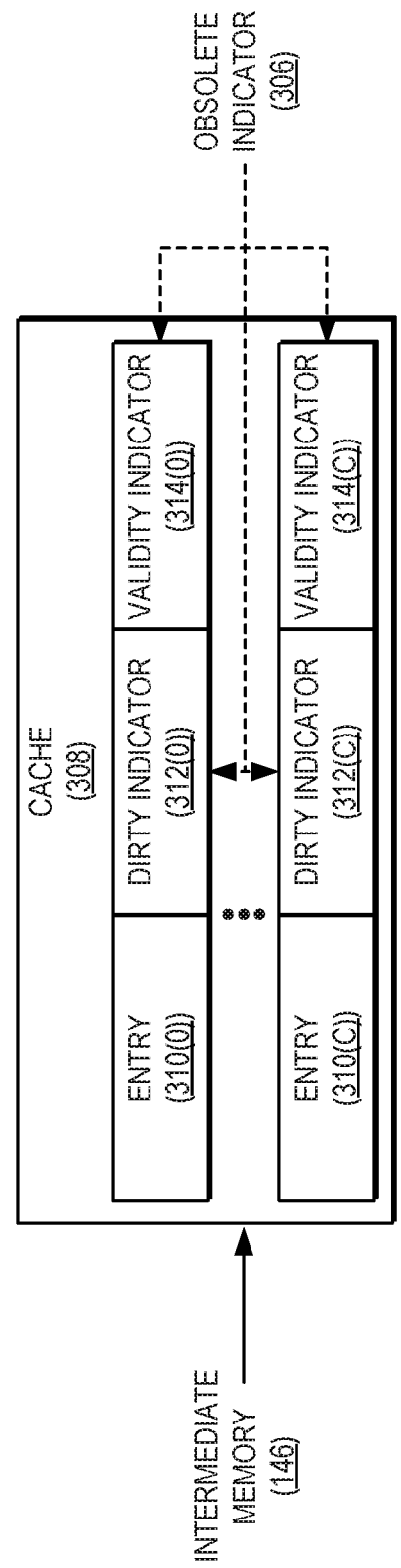

LOAD INSTRUCTION WITH FINAL READ INDICATOR FIELD TO INVALIDATE A BUFFER OR CACHE ENTRY STORING THE MEMORY ADDRESS HOLDING LOAD DATA

FIELD OF THE DISCLOSURE

The technology of the disclosure relates to memory access and maintenance in processor-based devices and, more particularly, to optimizing performance by avoiding unnecessary memory store operations to system memory.

BACKGROUND

Instruction set architectures (ISAs) on which processor-based devices are implemented are fundamentally oriented around the use of memory, with memory store instructions provided by an ISA to write values to a system memory and memory load instruction provided by the ISA to read values back from the system memory. One use of such memory store instructions and memory load instructions is to temporarily save, and then later restore, the values of registers to allow those registers to be used for other purposes within the processor-based device. A consequence of this usage of memory is that, once a memory load operation that reads a value from the system memory and restores the value to a register has been performed, it may no longer be necessary for the register value that was originally saved to continue to reside in the system memory. Such a value may be considered "obsolete," in the sense that no subsequent instructions will need to ever reference that memory location in the system memory for the purpose of obtaining the register value.

However, the rules under which conventional ISAs operate consider such values written to memory to be "persistent," such that each value that is stored to system memory remains available to any subsequent memory load instruction that reads that memory location, until a subsequent memory store instruction writes a new value to that memory location. The processor-based device thus is required to maintain the values in the system memory, even in cases where no instructions will attempt to read a value again before the value is overwritten by a subsequent memory store operation.

Moreover, some conventional ISAs support a feature known as "store-to-load forwarding," in which a memory load operation that follows an earlier memory store operation referencing the same memory location can be executed prior to the memory store operation having written its value to the system memory. With store-to-load forwarding, the value to be written by the memory store operation may be obtained from an intermediate memory, such as a store buffer, before it reaches the system memory, and may be used to execute the memory load operation. In such cases, if no subsequent memory load instruction will access the value after the memory load operation, the value may be considered obsolete even before the value reaches the system memory. As a result, the requirement that the processor-based device maintain the obsolete value results in unnecessary consumption of hardware resources such as store buffers, and increases the number of such hardware resources required to achieve a desired level of system performance.

Accordingly, a more efficient mechanism for obviating the need to maintain obsolete values is desirable.

SUMMARY

Exemplary embodiments disclosed herein include providing express memory obsolescence in processor-based devices. In this regard, in one exemplary embodiment, an instruction set architecture (ISA), on which a processor-based device is implemented, provides a memory load instruction that can indicate a final memory load operation from a given memory address (i.e., can indicate that after the memory load operation represented by the memory load instruction is performed, the value stored at the memory address no longer needs to be maintained). In some exemplary embodiments, the memory load instruction may comprise a custom opcode, while some exemplary embodiments may provide that the memory load instruction comprises an existing opcode and a custom final read indicator (e.g., a bit indicator). Upon an execution pipeline of a processing element (PE) of the processor-based device receiving the memory load instruction, an entry corresponding to the memory address of the memory load instruction is located in an intermediate memory that is external to the system memory of the processor-based device, and is used to perform the final memory load operation. In some exemplary embodiments, the intermediate memory may be a buffer (e.g., a store buffer, a writeback buffer, a precommit buffer, or a memory controller buffer, as non-limiting examples), or may be a cache (e.g., a data cache, a unified cache, or a Level 1 (L1), Level 2 (L2), Level 3 (L3), or Level 4 (L4) cache, as non-limiting examples).

After the final memory load operation is performed using the entry, an obsoletion logic circuit (located, e.g., in a load comparator or a cache controller, as non-limiting examples) sets an obsolete indicator for the entry to indicate that the entry can be reused prior to contents of the entry being written to the system memory. The obsolete indicator may be, for example, a validity indicator (in embodiments in which the intermediate memory is a buffer or a cache) or a dirty indicator (in embodiments in which the intermediate memory is a cache). The conventional buffer and/or cache maintenance operations performed by the processor-based device may then release the entry for reuse before the contents of the entry are written to the system memory. In some embodiments, the processor-based device may also cancel a pending memory store operation initiated by a memory store instruction that precedes the memory load instruction.

In another exemplary embodiment, a processor-based device is provided. The processor-based device comprises a system memory, and further comprises a processing element (PE) that includes an execution pipeline comprising one or more load stages, and one or more load comparators. The processor-based device also comprises an intermediate memory external to the system memory and comprising a plurality of entries and a corresponding plurality of obsolete indicators. The processor-based device is configured to receive, using the execution pipeline of the PE, a memory load instruction comprising a memory address, the memory load instruction indicating a final memory load operation from the memory address. The processor-based device is further configured to locate, by a load comparator of the one or more load comparators of the PE, an entry corresponding to the memory address among the plurality of entries within the intermediate memory. The processor-based device is also configured to perform the final memory load operation using the entry. The processor-based device is additionally configured to set, using an obsoletion logic circuit of the processor-based device, a value of an obsolete indicator of the entry, wherein the obsolete indicator of the entry indicates that the entry can be reused prior to contents of the entry being written to the system memory.

In another exemplary embodiment, a method for providing express memory obsolescence in processor-based devices is provided. The method comprises receiving, using an execution pipeline of a processing element (PE) of a processor-based device, a memory load instruction comprising a memory address, the memory load instruction indicating a final memory load operation from the memory address. The method further comprises locating, using a load comparator of the PE, an entry corresponding to the memory address among a plurality of entries of an intermediate memory external to a system memory of the processor-based device. The method also comprises performing the final memory load operation using the entry. The method additionally comprises setting, using an obsoletion logic circuit of the processor-based device, a value of an obsolete indicator of the entry, wherein the obsolete indicator of the entry indicates that the entry can be reused prior to contents of the entry being written to the system memory.

In another exemplary embodiment, a non-transitory computer-readable medium is provided. The computer-readable memory stores thereon an instruction program comprising a plurality of computer executable instructions for execution by a processor, the plurality of computer executable instructions comprising a memory load instruction comprising a memory address, the memory load instruction indicating a final memory load operation from the memory address.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

FIGS. 3A and 3B are block diagrams illustrating exemplary buffer and cache embodiments, respectively, of the intermediate memory of FIG. 1 that may be used to perform express memory obsolescence operations;

DETAILED DESCRIPTION

Exemplary embodiments disclosed herein include providing express memory obsolescence in processor-based devices. In this regard, in one exemplary embodiment, an instruction set architecture (ISA), on which a processor-based device is implemented, provides a memory load instruction that can indicate a final memory load operation from a given memory address (i.e., can indicate that after the memory load operation represented by the memory load instruction is performed, the value stored at the memory address no longer needs to be maintained). In some exemplary embodiments, the memory load instruction may comprise a custom opcode, while some exemplary embodiments may provide that the memory load instruction comprises an existing opcode and a custom final read indicator (e.g., a bit indicator). Upon an execution pipeline of a processing element (PE) of the processor-based device receiving the memory load instruction, an entry corresponding to the memory address of the memory load instruction is located in an intermediate memory that is external to the system memory of the processor-based device, and is used to perform the final memory load operation. In some exemplary embodiments, the intermediate memory may be a buffer (e.g., a store buffer, a writeback buffer, a precommit buffer, or a memory controller buffer, as non-limiting examples), or may be a cache (e.g., a data cache, a unified cache, or a Level 1 (L1), Level 2 (L2), Level 3 (L3), or Level 4 (L4) cache, as non-limiting examples).

After the final memory load operation is performed using the entry, an obsoletion logic circuit (located, e.g., in a load comparator or a cache controller, as non-limiting examples) sets a value of an obsolete indicator for the entry to indicate that the entry can be reused prior to contents of the entry being written to the system memory. The obsolete indicator may be, for example, a validity indicator (in embodiments in which the intermediate memory is a buffer or a cache) or a dirty indicator (in embodiments in which the intermediate memory is a cache). The conventional buffer and/or cache maintenance operations performed by the processor-based device may then release the entry for reuse before the contents of the entry are written to the system memory. In some embodiments, the processor-based device may also cancel a pending memory store operation initiated by a memory store instruction that precedes the memory load instruction.

Figure 1:
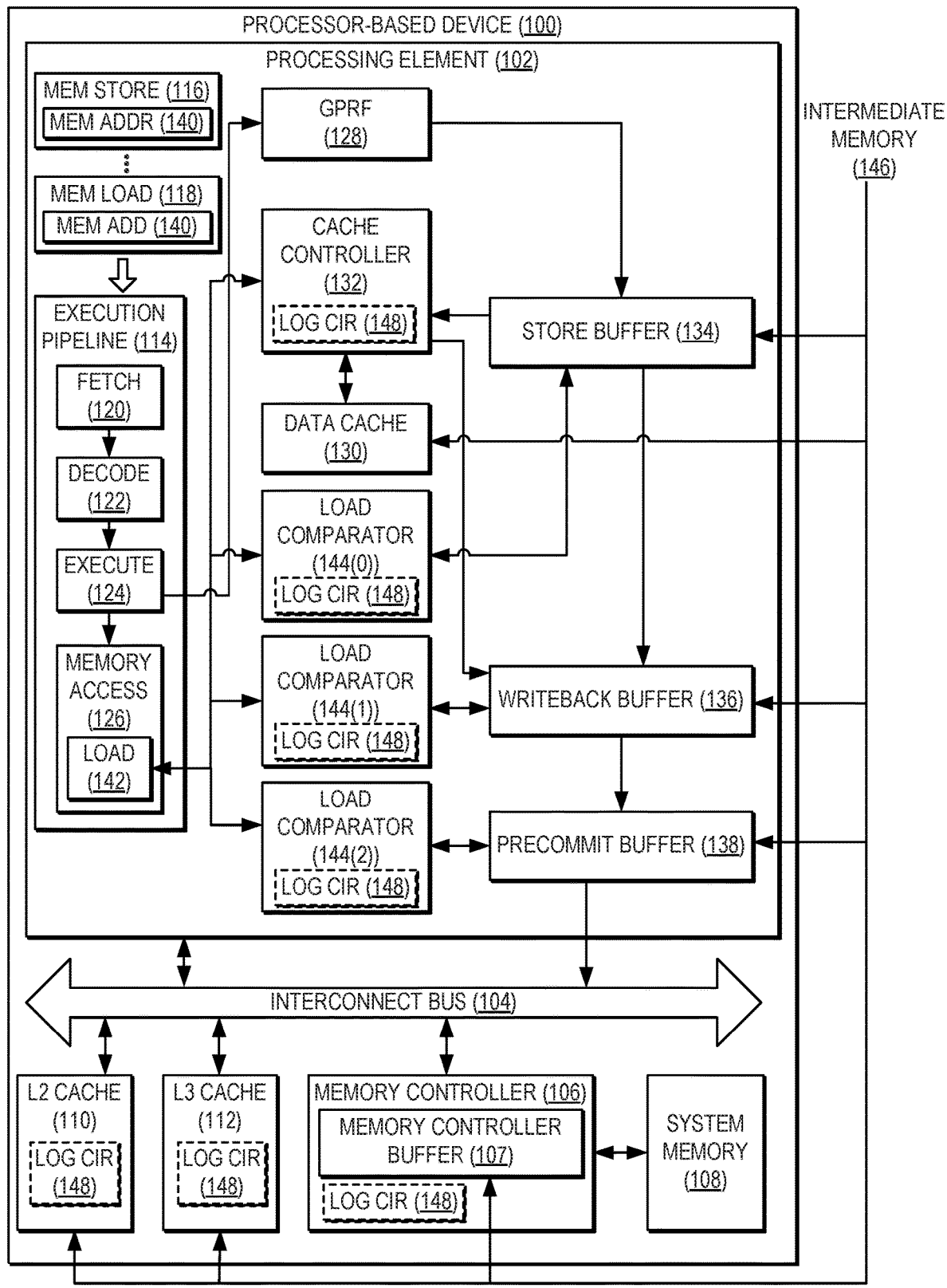
FIG. 1 is a schematic diagram of an exemplary processor-based device that includes a processing element (PE) for providing express memory obsolescence.

In this regard, FIG. 1 illustrates an exemplary processor-based device 100 that provides a processing element (PE) 102 for providing express memory obsolescence. The PE 102 may comprise a central processing unit (CPU) having one or more processor cores, or may comprise an individual processor core comprising a logical execution unit and associated caches and functional units. Additionally, in some embodiments, the PE 102 may be one of a plurality of similarly configured PEs (not shown) of the processor-based device 100.

In the example of FIG. 1, the PE 102 is communicatively coupled to an interconnect bus 104, which in some embodiments may include additional constituent elements (e.g., a bus controller circuit and/or an arbitration circuit, as non-limiting examples) that are not shown in FIG. 1 for the sake of clarity. The PE 102 is also communicatively coupled via the interconnect bus 104 to a memory controller 106 that includes a memory controller buffer 107, and that controls access to a system memory 108 and manages the flow of data to and from the system memory 108. The system memory 108 provides addressable memory used for data storage by the processor-based device 100, and as such may comprise synchronous dynamic random access memory (SDRAM), as a non-limiting example. The PE 102 in the example of FIG. 1 is also communicatively coupled via the interconnect bus 104 to a Level 2 (L2) cache 110 and a Level 3 (L3) cache 112, each of which represents a layer of a hierarchical cache structure used by the processor-based device 100 to cache frequently accessed data for faster retrieval (compared to retrieving data from the system memory 108).

The PE 102 of FIG. 1 includes an execution pipeline 114 that comprises circuitry configured to execute an instruction stream of computer-executable instructions, such as an exemplary memory store instruction ("MEM STORE") 116 and a subsequent memory load instruction ("MEM LOAD") 118. In the example of FIG. 1, the execution pipeline 114 includes a fetch stage 120 for retrieving instructions for execution, a decode stage 122 for translating fetched instructions into control signals for instruction execution, an execute stage 124 for actually performing instruction execution, and a memory access stage 126 for carrying out memory access operations (e.g., memory load operations and/or memory store operations) resulting from instruction execution. It is to be understood that, in some embodiments, the execution pipeline 114 may include fewer or more stages than those illustrated in the example of FIG. 1.

In the example of FIG. 1, the PE 102 also includes a general purpose register file ("GPRF") 128 that provides multiple registers for use by hardware and software for storing operands upon which arithmetic and logical operations may be performed. The PE 102 of FIG. 1 further includes a data cache 130 that is managed by a cache controller 132, and that may be used to cache local copies of frequently accessed data within the PE 102 for quicker access by the memory access stage 126 of the execution pipeline 114.

In conventional operation, the execute stage 124 of the execution pipeline may access the GPRF 128 to retrieve operands and/or store results of arithmetic or logical operations. The results of memory store operations, which are to be eventually committed to the system memory 108, may first be temporarily stored in a store buffer 134 prior to being optionally cached in the data cache 130. Data values from the store buffer 134 and/or the data cache 130 may then move to a writeback buffer 136 and subsequently to a precommit buffer 138 before being written to the system memory 108.

As noted above, some conventional ISAs support store-to-load forwarding, which enables a memory load instruction, such as the memory load instruction 118, that references a memory address 140 and that follows the earlier memory store instruction 116 (i.e., preceding the memory load instruction 118 in program order) referencing the same memory address 140 to be executed prior to the memory store instruction 116 having written its value to the system memory 108 (i.e., prior to a pending memory store operation initiated by the memory store instruction 116 being completed). This may be accomplished by retrieving the value being written by the memory store instruction 116 from, e.g., the store buffer 134, the writeback buffer 136, or the precommit buffer 138, before the value is sent to the system memory 108. Accordingly, in the example of FIG. 1, the memory access stage 126 of the execution pipeline includes one or more load stages ("LOAD"). Before attempting to access the system memory 108 to retrieve data for the memory load instruction 118, the load stage(s) 142 may use load comparators 144(0)-144(2) (corresponding to the store buffer 134, the writeback buffer 136, and the precommit buffer 138, respectively) to determine whether the respective buffers contain an entry corresponding to the memory address 140 of the memory load instruction 118. If so, that entry may be used to perform the memory load operation without waiting for the results of the memory store instruction 116 to be committed to the system memory 108.

The processor-based device 100 of FIG. 1 may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include more or fewer elements than illustrated in FIG. 1. For example, the PE 102 may further include more or fewer memory devices execution pipeline stages, and/or controller circuits. In particular, the processor-based device 100 in some embodiments may further include buffers and caches (e.g., an L1 cache, an L4 cache, and/or a unified cache, as non-limiting examples), in addition to or instead of the caches illustrated in FIG. 1.

As discussed above, one use of instructions such as the memory store instruction 116 and the memory load instruction 118 is to temporarily save, and then later restore, the values of registers (e.g., within the GPRF 128) to allow those registers to be used for other purposes within the processor-based device 100. Consequently, once the memory load instruction 118 has been performed, it may no longer be necessary for the value that was read to continue to reside in the system memory 108. Such a value may be considered "obsolete," in the sense that no subsequent instructions will need to ever reference that memory location in the system memory 108 for the purpose of obtaining its value. However, conventional embodiments of a processor-based device may be required to maintain such values, even in cases where no memory load operations will attempt to read a value again before the value is overwritten by a subsequent memory store operation. Moreover, in the store-to-load forwarding scenario described above, if the value that is read from, e.g., the store buffer 134, the writeback buffer 136, or the precommit buffer 138 is not accessed again by subsequent memory load operations, the value may be considered obsolete before the value reaches the system memory 108. As a result, entries within the store buffer 134, the writeback buffer 136, and the precommit buffer 138 may be wasted by being used to store obsolete data, and system resources may be wasted in maintaining the obsolete data as it moves through the buffers to the system memory 108.

In this regard, the processor-based device 100 is configured to provide express memory obsolescence. In particular, the memory load instruction 118 provided by the ISA of the processor-based device 100 indicates a final memory load operation from the memory address 140 (i.e., indicates that the current contents stored at the memory address 140 will not be accessed again by memory load instructions following the memory load instruction 118). Thus, after the execution pipeline 114 of the processing element 102 receives the memory load instruction 118, an entry corresponding to the memory address 140 is located within an intermediate memory 146 of the processor-based device 100. As discussed in greater detail below, the intermediate memory 146 may comprise one or more buffers (such as the store buffer 134, the writeback buffer 136, the precommit buffer 138, and/or the memory controller buffer 107, as non-limiting examples) and/or caches (e.g., the data cache 130, the L2 cache 110, and/or the L3 cache 112, as non-limiting examples) of the processor-based device 100.

The final memory load operation is performed using the entry (e.g., using conventional store-to-load forwarding to read from a buffer or by accessing cached data from a cache, as non-limiting examples), and a value of an obsolete indicator for the entry is then set to indicate that the entry can be reused prior to contents of the entry being written to the system memory 108. Because the intermediate memory 146 may comprise one or more buffers and/or caches within the processor-based device 100, logic for setting the value of the obsolete indicator may be embodied by obsolescence logic circuits ("LOG CIR") 148 in one or more of the cache controller 132, the load comparators 144(0)-144(2), the L2 cache 110 (or a cache controller thereof), the L3 cache 113 (or a cache controller thereof), and/or the memory controller buffer 107. As discussed below in greater detail with respect to FIGS. 3A and 3B, in embodiments in which the intermediate memory 146 is a buffer or a cache, the obsolete indicator may be a validity indicator whose value is set to indicate that the entry is no longer valid (e.g., by setting the value of the validity indicator to "false" or zero (0), as non-limiting examples). Embodiments in which the intermediate memory 146 is a cache may provide that the obsolete indicator is a dirty indicator whose value is set to indicate that contents of the entry have not been modified. Thus, in the latter embodiments, setting the value of the obsolete indicator may comprise setting the value of the dirty indicator to "false" or zero (0), so that the contents of the cache line will not be written to the system memory 108.

In some embodiments, after the value of the obsolete indicator of the entry is set, the processor-based device 100 may detect that the obsolete indicator indicates that the entry can be reused, and may release the entry for reuse prior to contents of the entry being written to the system memory 108. For example, in embodiments in which the intermediate memory 146 is a buffer or a cache and the obsolete indicator is a validity indicator of a buffer entry, the processor-based device 100 may detect that the buffer or cache entry is no longer valid, and may reuse the buffer or cache entry. Similarly, in embodiments in which the intermediate memory 146 is a cache and the obsolete indicator is a dirty indicator of a cache entry, the processor-based device 100 may detect that the cache entry is not dirty (i.e., does not contain modified data), and may avoid writing the contents of the cache entry to the system memory 108.

According to some embodiments in which the PE 102 is one of a plurality of PEs of the processor-based device 100, after detecting that the obsolete indicator indicates that the entry can be reused, the processor-based device 100 may be configured to cancel a coherency operation corresponding to the memory address 140 from a first PE (e.g., the PE 102) to one or more other PEs of the plurality of PEs of the processor-based device 100. For example, the PE 102 may be conventionally configured to update other PEs of the processor-based device 100 to indicate that a cache entry of a cache has changed state (e.g., has been modified or has been rendered invalid, as non-limiting examples) as a result of a memory store operation to the memory address 140. The PE 102 thus may be conventionally configured to perform a coherency operation to inform other PEs of the processor-based device 100 of the change in state. However, performing the final memory store operation as described herein may render such coherency operations unnecessary, and therefore the PE 102 may cancel such coherency operations corresponding to the memory address 140 when the final memory store operation is performed.

Embodiments of the processor-based device 100 may also be configured to, subsequent to setting the value of the obsolete indicator of the entry, cancel the memory store instruction 116 to the memory address 140 (i.e., the memory store instruction 116 that wrote the data to the entry within the intermediate memory 146 used to perform the final memory load operation) before the results of the memory store instruction 116 are committed to the system memory 108. This may save system resources that would otherwise be consumed in completing the processing of the memory store instruction 116 even though the processor-based device 100 has already been made aware by the memory load instruction 118 that the contents to be stored at the memory address 140 will not be accessed by any subsequent memory load instructions. Some embodiments of the processor-based device 100 may provide further security by being configured to overwrite the contents of the entry after performing the memory load operation indicated by the memory load instruction 118.

Figure 2A:
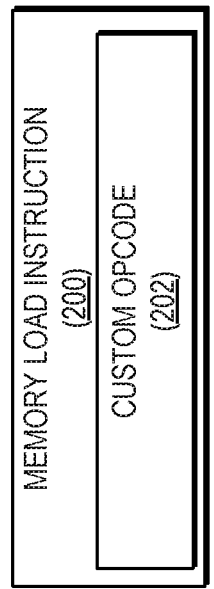
FIGS. 2A and 2B are block diagrams illustrating exemplary memory load instructions corresponding to the memory load instruction of FIG. 1 for indicating a final memory load operation.
Figure 2B:
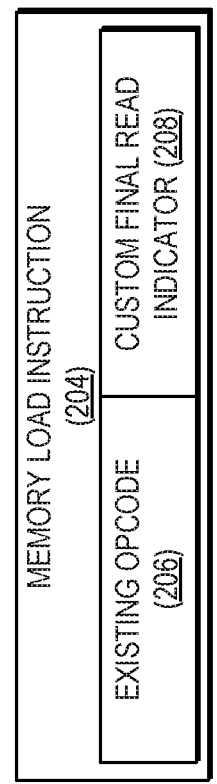

To illustrate exemplary memory load operations corresponding to the memory load instruction 118 of FIG. 1 for indicating a final memory load operation, FIGS. 2A and 2B are provided. FIG. 2A illustrates a memory load instruction 200 corresponding in functionality to the memory load instruction 118 of FIG. 1. In the example of FIG. 2A, the memory load instruction 200 comprises a custom opcode 202 (i.e., an opcode specifically provided by an underlying ISA for use in expressly indicating memory obsolescence). In contrast, FIG. 2B illustrates a memory load instruction 204 that comprises an existing opcode 206 and a custom final read indicator 208. The existing opcode 206 corresponds to an opcode provided by the ISA for conventional memory load operations, while the custom final read indicator 208 comprises an additional indicator (e.g., a bit indicator) that may be set to indicate that the memory load operation to be performed is a final memory load operation to the specified memory address.

FIGS. 3A and 3B illustrate exemplary buffer and cache embodiments, respectively, of the intermediate memory 146 of FIG. 1 upon which express memory obsolescence operations may be performed. In the example of FIG. 3A, the intermediate memory 146 comprises a buffer 300, which may correspond to, e.g., the store buffer 134, the writeback buffer 136, the precommit buffer 138, and/or the memory controller buffer 107 of FIG. 1, as non-limiting examples. The buffer 300 includes a plurality of entries 302(0)-302(B), each of which is associated with a corresponding validity indicator 304(0)-304(B) that indicates whether the associated entry 302(0)-302(B) is in a valid state. As noted above, for embodiments in which the intermediate memory 146 is a buffer such as the buffer 300, each of the validity indicators 304(0)-304(B) may be considered an obsolete indicator 306 for the associated entry 302(0)-302(B).

In FIG. 3B, the intermediate memory 146 comprises a cache 308, which may correspond to, e.g., the data cache 130, the L2 cache 110, and/or the L3 cache 112 of FIG. 1, as non-limiting examples. As seen in FIG. 3B, the cache 308 includes a plurality of entries 310(0)-310(C), each associated with a corresponding dirty indicator 312(0)-312(C) that indicates whether the associated entry 310(0)-310(C) contains dirty (i.e., modified) data. Each of the plurality of entries 310(0)-310(C) is also associated with a corresponding validity indicator 314(0)-314(C) that indicates whether the associated entry 310(0)-310(C) is in a valid state. Accordingly, for some embodiments in which the intermediate memory 146 is a cache such as the cache 308, each of the dirty indicators 312(0)-312(C) may be considered the obsolete indicator 306 for the associated entry 310(0)-310(C), while some embodiments may use each of the validity indicators 314(0)-314(C) as the obsolete indicator 306 for the associated entry 310(0)-310(C).

Figure 4A:
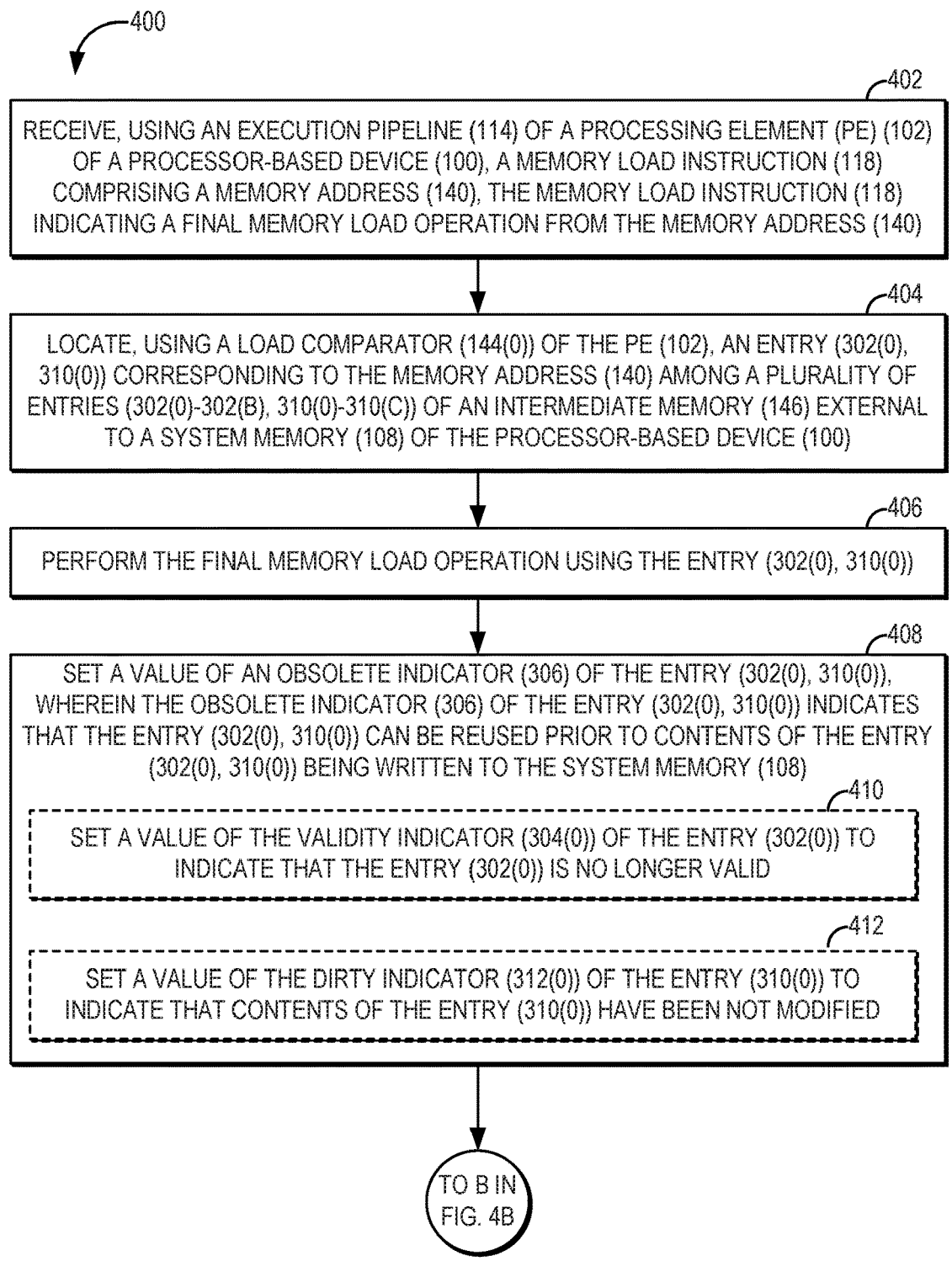
FIGS. 4A and 4B are flowcharts illustrating exemplary operations for providing express memory obsolescence by the processor-based device of FIG. 1.
Figure 4B:
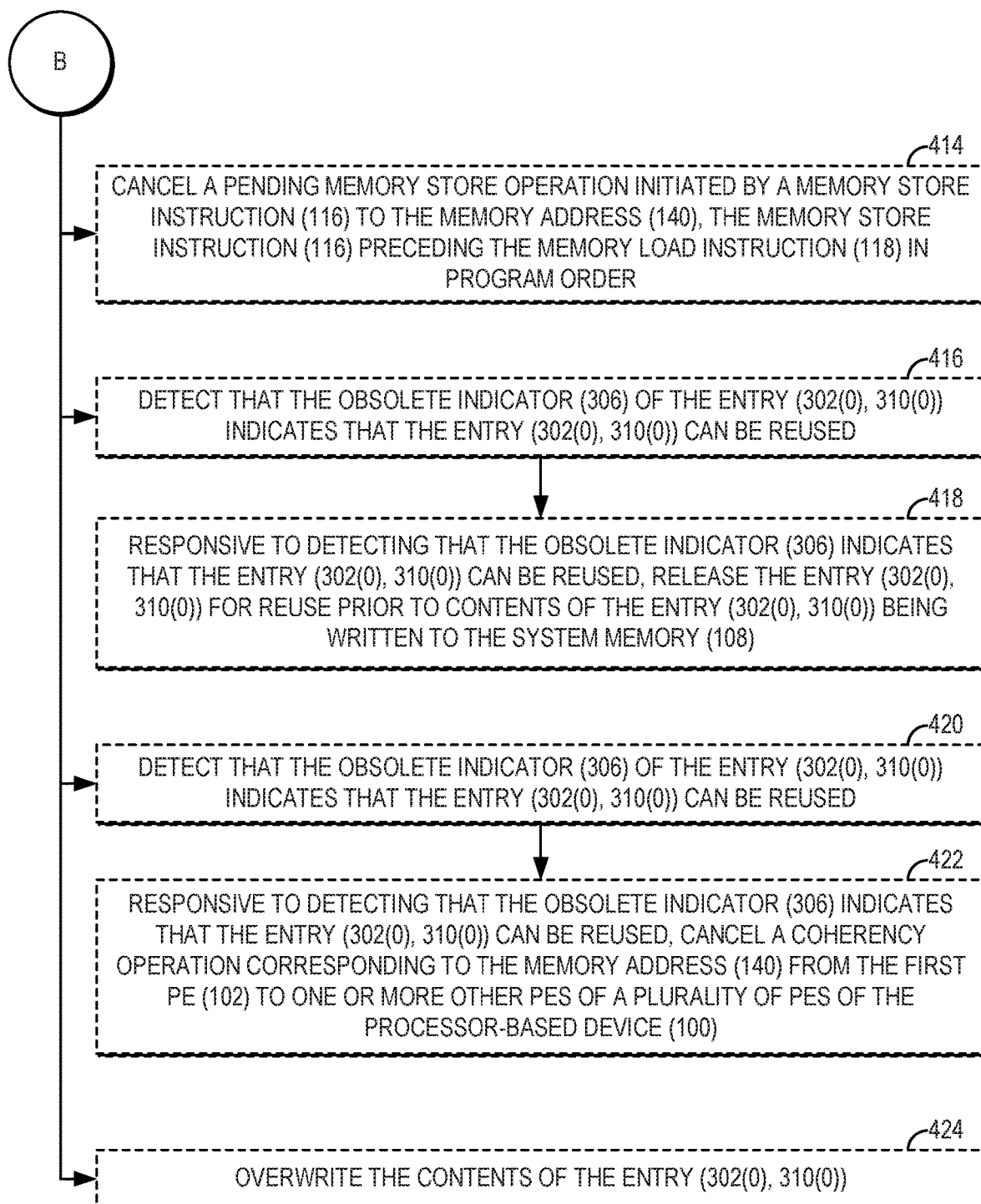

FIGS. 4A and 4B illustrate exemplary operations 400 for providing express memory obsolescence by the processor-based device 100 of FIG. 1. For the sake of clarity, elements of FIGS. 1, 3A, and 3B are referenced in describing FIGS. 4A and 4B. The operations 400 in FIG. 4A, according to some embodiments, begin with the execution pipeline 114 of the PE 102 of the processor-based device 100 receiving the memory load instruction 118 comprising the memory address 140, the memory load instruction 118 indicating a final memory load operation from the memory address 140 (block 402). The processor-based device 100 locates an entry (e.g., one of the entries 302(0) or 310(0) of FIGS. 3A and 3B) corresponding to the memory address 140 among a plurality of entries 302(0)-302(B), 310(0)-310(C) of an intermediate memory 146 external to the system memory 108 of the processor-based device 100 (block 404). The processor-based device 100 then performs the final memory load operation using the entry 302(0), 310(0) (block 406).

The processor-based device 100 next sets the value of the obsolete indicator 306 of the entry 302(0), 310(0), wherein the obsolete indicator 306 of the entry 302(0), 310(0) indicates that the entry 302(0), 310(0) can be reused prior to contents of the entry 302(0), 310(0) being written to the system memory 108 (block 408). In some embodiments (e.g., where the intermediate memory 146 is a buffer or a cache), the operations of block 408 for setting the value of the obsolete indicator 306 may comprise setting, for example, a value of the validity indicator 304(0) of the entry 302(0) to indicate that the entry 302(0) is no longer valid (block 410). Some embodiments (e.g., where the intermediate memory 146 is a cache) may provide that the operations of block 408 for setting the value of the obsolete indicator 306 may comprise setting, for example, a value of the dirty indicator 312(0) of the entry 310(0) to indicate that contents of the entry 310(0) have not been modified (block 412). Processing in some embodiments may then resume in FIG. 4B.

Referring now to FIG. 4B, further operations that may be performed by the processor-based device 100 are illustrated. In some embodiments, the processor-based device 100 may next cancel a pending memory store operation initiated by the memory store instruction 116 to the memory address 140, the memory store instruction 116 preceding the memory load instruction 118 in program order (block 414). Some embodiments may provide that the processor-based device 100 detects that the obsolete indicator 306 of the entry 302(0), 310(0) indicates that the entry 302(0), 310(0) can be reused (block 416). Responsive to detecting that the obsolete indicator 306 indicates that the entry 302(0), 310(0) can be reused, the processor-based device 100 may release the entry 302(0), 310(0) for reuse prior to contents of the entry 302(0), 310(0) being written to the system memory 108 (block 418).

According to some embodiments, the processor-based device 100 may detect that the obsolete indicator 306 of the entry 302(0), 310(0) indicates that the entry 302(0), 310(0) can be reused (block 420). Responsive to detecting that the obsolete indicator 306 indicates that the entry 302(0), 310(0) can be reused, the processor-based device 100, in embodiments in which the PE 102 is one of a plurality of PEs, may cancel a coherency operation corresponding to the memory address 140 from a first PE (e.g., the PE 102) to one or more other PEs of the plurality of PEs of the processor-based device 100 (block 422). Some embodiments may provide that the processor-based device 100 may overwrite the contents of the entry 302(0), 310(0) (block 424).

Figure 5:
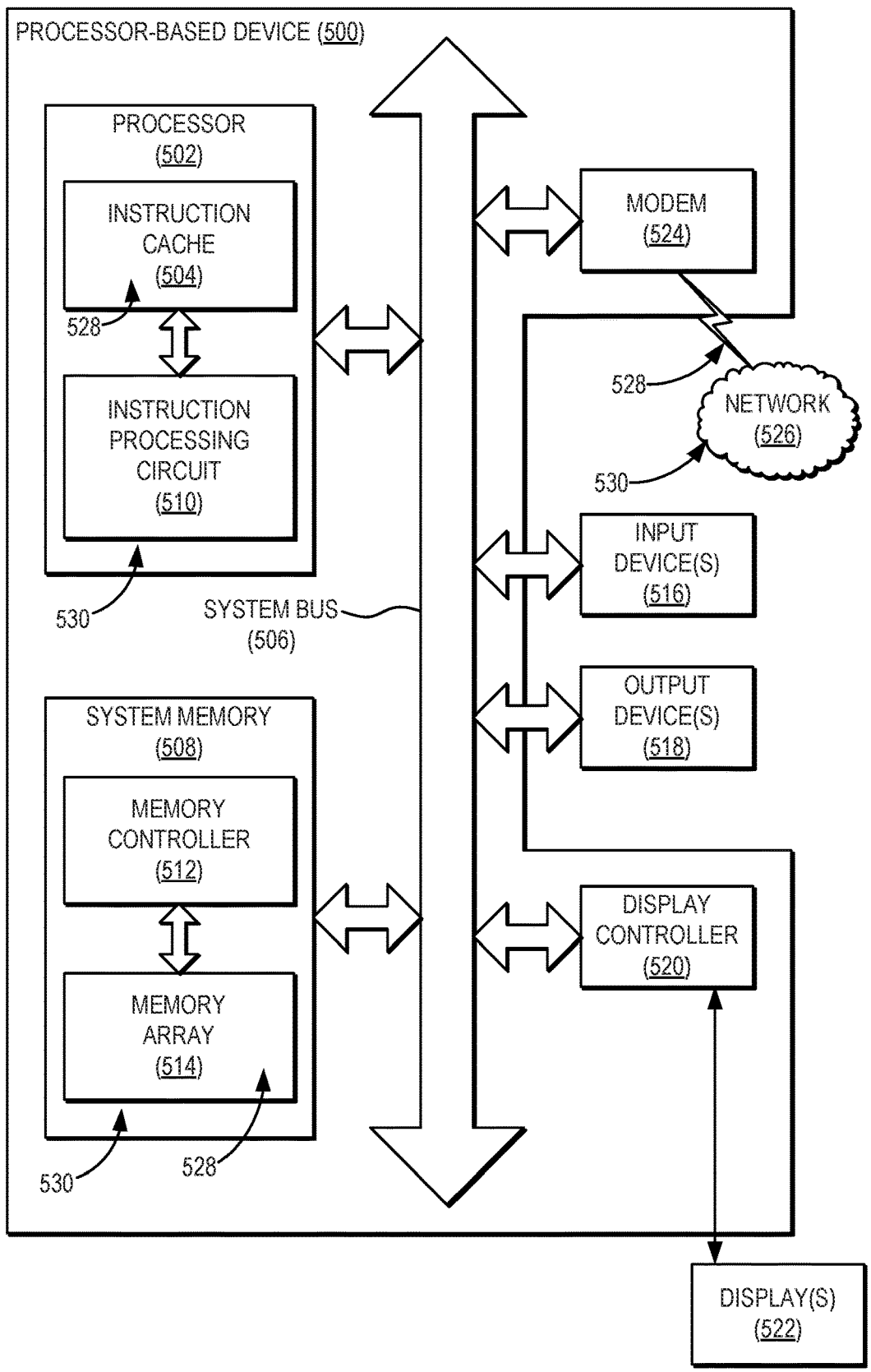
FIG. 5 is a block diagram of an exemplary processor-based device, such as the processor-based device of FIG. 1, that is configured to provide express memory obsolescence.

FIG. 5 is a block diagram of an exemplary processor-based device 500, such as the processor-based device 100 of FIG. 1, that provides express memory obsolescence. The processor-based device 500 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 500 includes a processor 502. The processor 502 represents one or more general-purpose processing circuits, such as a microprocessor, central processing unit, or the like, and may correspond to the PE 102 of FIG. 1. The processor 502 is configured to execute processing logic in instructions for performing the operations and steps discussed herein. In this example, the processor 502 includes an instruction cache 504 for temporary, fast access memory storage of instructions and an instruction processing circuit 510. Fetched or prefetched instructions from a memory, such as from a system memory 508 over a system bus 506, are stored in the instruction cache 504. The instruction processing circuit 510 is configured to process instructions fetched into the instruction cache 504 and process the instructions for execution.

The processor 502 and the system memory 508 are coupled to the system bus 506 (corresponding to the interconnect bus 104 of FIG. 1) and can intercouple peripheral devices included in the processor-based device 500. As is well known, the processor 502 communicates with these other devices by exchanging address, control, and data information over the system bus 506. For example, the processor 502 can communicate bus transaction requests to a memory controller 512 in the system memory 508 as an example of a peripheral device. Although not illustrated in FIG. 5, multiple system buses 506 could be provided, wherein each system bus constitutes a different fabric. In this example, the memory controller 512 is configured to provide memory access requests to a memory array 514 in the system memory 508. The memory array 514 is comprised of an array of storage bit cells for storing data. The system memory 508 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 506. As illustrated in FIG. 5, these devices can include the system memory 508, one or more input devices 516, one or more output devices 518, a modem 524, and one or more display controllers 520, as examples. The input device(s) 516 can include any type of input device, including, but not limited to, input keys, switches, voice processors, etc. The output device(s) 518 can include any type of output device, including, but not limited to, audio, video, other visual indicators, etc. The modem 524 can be any device configured to allow exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The modem 524 can be configured to support any type of communications protocol desired. The processor 502 may also be configured to access the display controller(s) 520 over the system bus 506 to control information sent to one or more displays 522. The display(s) 522 can include any type of display, including, but not limited to, a cathode ray tube (CRT), a liquid crystal display (LCD), a plasma display, etc.

The processor-based device 500 in FIG. 5 may include a set of instructions 528 that may be encoded with the reachbased explicit consumer naming model to be executed by the processor 502 for any application desired according to the instructions. The instructions 528 may be stored in the system memory 508, processor 502, and/or instruction cache 504 as examples of non-transitory computer-readable medium 530. The instructions 528 may also reside, completely or at least partially, within the system memory 508 and/or within the processor 502 during their execution. The instructions 528 may further be transmitted or received over the network 526 via the modem 524, such that the network 526 includes the computer-readable medium 530.

While the computer-readable medium 530 is shown in an exemplary embodiment to be a single medium, the term "computer-readable medium" should be taken to include a single medium or multiple media (e.g., a centralized or distributed database, and/or associated caches and servers) that store the one or more sets of instructions 528. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques.

For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
   a system memory;
   a processing element (PE) comprising an execution pipeline; and
   an intermediate memory external to the system memory and comprising a plurality of entries and a corresponding plurality of obsolete indicators;
   the processor-based device configured to:
      receive, using the execution pipeline of the PE, a memory load instruction comprising a memory address, the memory load instruction indicating a final memory load operation from the memory address;
      locate an entry corresponding to the memory address among the plurality of entries within the intermediate memory;
      perform the final memory load operation using the entry; and
      set, using an obsoletion logic circuit of the processor-based device, a value of an obsolete indicator of the entry, wherein the obsolete indicator of the entry indicates that the entry can be reused prior to contents of the entry being written to the system memory.

2. The processor-based device of claim 1, wherein:
   the intermediate memory comprises one or more of a buffer and a cache;
   the plurality of obsolete indicators comprises a plurality of validity indicators of the corresponding plurality of entries; and
   the processor-based device is configured to set the value of the obsolete indicator of the entry by being configured to set a value of a validity indicator of the entry to indicate that the entry is no longer valid.

3. The processor-based device of claim 1, wherein:
   the intermediate memory comprises a cache;
   the plurality of obsolete indicators comprises a plurality of dirty indicators of the corresponding plurality of entries; and
   the processor-based device is configured to set the value of the obsolete indicator of the entry by being configured to set a value of a dirty indicator of the entry to indicate that the contents of the entry have not been modified.

4. The processor-based device of claim 1, wherein the processor-based device is further configured to:
   detect that the obsolete indicator of the entry indicates that the entry can be reused; and
   responsive to detecting that the obsolete indicator indicates that the entry can be reused, release the entry for reuse prior to the contents of the entry being written to the system memory.

5. The processor-based device of claim 1, wherein the processor-based device is further configured to, subsequent to setting the value of the obsolete indicator of the entry, cancel a pending memory store operation initiated by a memory store instruction to the memory address, the memory store instruction preceding the memory load instruction in program order.

6. The processor-based device of claim 1, wherein:
   the PE comprises a first PE of a plurality of PEs of the processor-based device; and
   the processor-based device is further configured to:
      detect that the obsolete indicator of the entry indicates that the entry can be reused; and
      responsive to detecting that the obsolete indicator indicates that the entry is obsolete, cancel a coherency operation corresponding to the memory address from the first PE to one or more other PEs of the plurality of PEs of the processor-based device.

7. The processor-based device of claim 1, wherein the processor-based device is further configured to, subsequent to performing the final memory load operation, overwrite the contents of the entry.

8. The processor-based device of claim 1, wherein the memory load instruction comprises a custom opcode of an instruction set architecture (ISA) of the processor-based device.

9. The processor-based device of claim 1, wherein the memory load instruction comprises an existing opcode of an ISA of the processor-based device and a custom final read indicator.

10. A method for providing express memory obsolescence in processor-based devices, comprising:
    receiving, using an execution pipeline of a processing element (PE) of a processor-based device, a memory load instruction comprising a memory address, the memory load instruction indicating a final memory load operation from the memory address;
    locating an entry corresponding to the memory address among a plurality of entries of an intermediate memory external to a system memory of the processor-based device;
    performing the final memory load operation using the entry; and
    setting, using an obsoletion logic circuit of the processor-based device, a value of an obsolete indicator of the entry, wherein the obsolete indicator of the entry indicates that the entry can be reused prior to contents of the entry being written to the system memory.

11. The method of claim 10, wherein:
    the intermediate memory comprises one or more of a buffer and a cache;
    the obsolete indicator comprises a validity indicator of the entry; and
    setting the obsolete indicator of the entry comprises setting a value of the validity indicator of the entry to indicate that the entry is no longer valid.

12. The method of claim 10, wherein:
the intermediate memory comprises a cache;
the obsolete indicator comprises a dirty indicator of the entry; and
setting the obsolete indicator of the entry comprises setting a value of the dirty indicator of the entry to indicate that the contents of the entry have not been modified.

13. The method of claim 10, further comprising:
detecting that the obsolete indicator of the entry indicates that the entry can be reused; and
responsive to detecting that the obsolete indicator indicates that the entry can be reused, releasing the entry for reuse prior to the contents of the entry being written to the system memory.

14. The method of claim 10, further comprising, subsequent to setting the value of the obsolete indicator of the entry, canceling a pending memory store operation initiated by a memory store instruction to the memory address, the memory store instruction preceding the memory load instruction in program order.

15. The method of claim 10, wherein:
the PE comprises a first PE of a plurality of PEs of the processor-based device; and
the method further comprises:
detecting that the obsolete indicator of the entry indicates that the entry can be reused; and
responsive to detecting that the obsolete indicator indicates that the entry can be reused, cancelling a coherency operation corresponding to the memory address from the first PE to one or more other PEs of the plurality of PEs of the processor-based device.

16. The method of claim 10, further comprising, subsequent to performing the memory load operation, overwriting the contents of the entry.

17. The method of claim 10, wherein the memory load instruction comprises a custom opcode of an instruction set architecture (ISA) of the processor-based device.

18. The method of claim 10, wherein the memory load instruction comprises an existing opcode of an ISA of the processor-based device and a custom final read indicator.

* * * * *